INVENTOR.
HERMAN D. WENDT.
BY Maurice A. Crews
ATTORNEY.

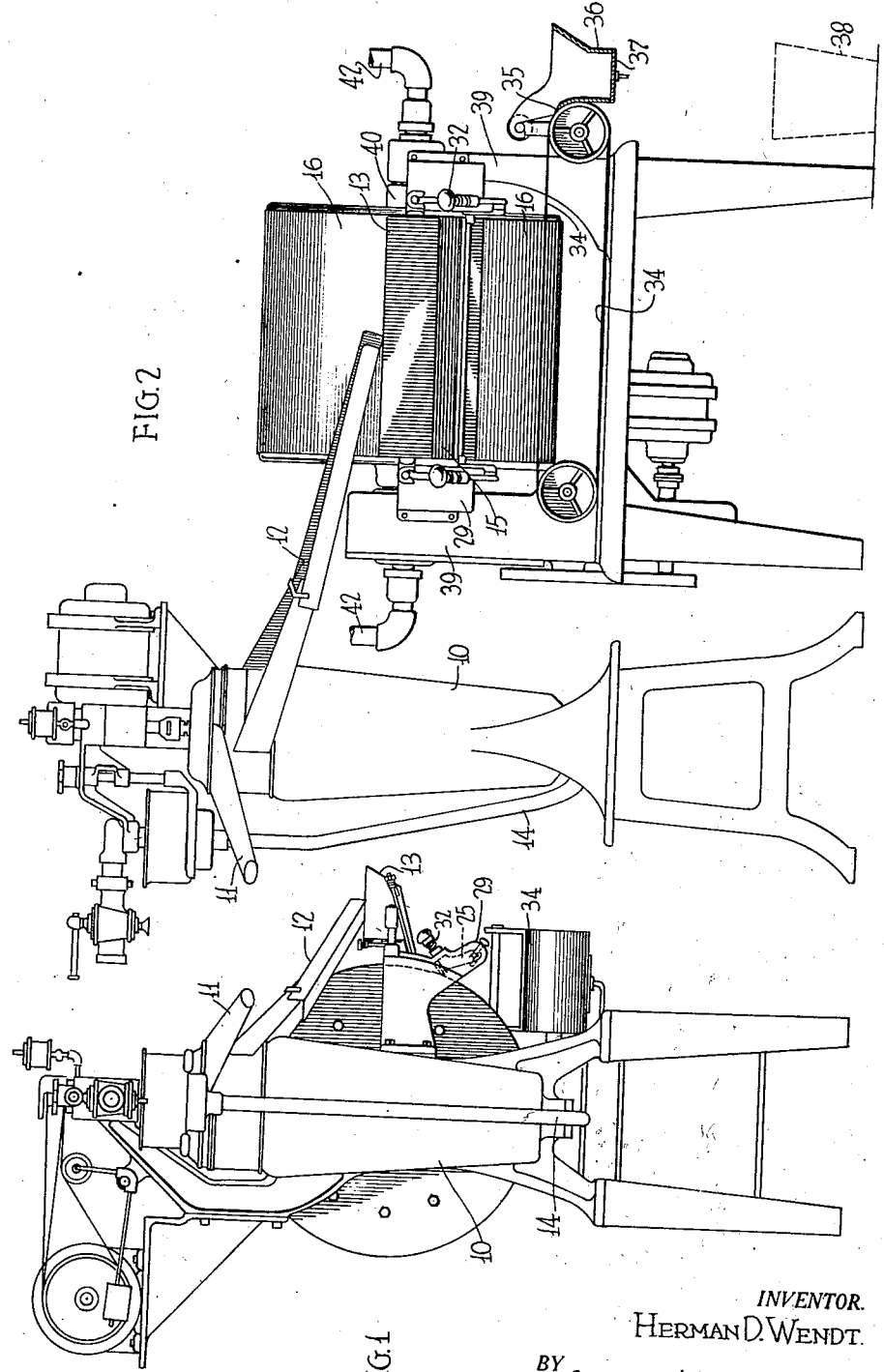

July 20, 1937.  H. D. WENDT  2,087,587
MANUFACTURE OF PLASTIC CREAM
Filed Jan. 4, 1934  3 Sheets-Sheet 3

INVENTOR.
HERMAN D. WENDT.
BY Maurice A. Crews
ATTORNEY.

Patented July 20, 1937

2,087,587

UNITED STATES PATENT OFFICE 2,087,587

MANUFACTURE OF PLASTIC CREAM

Herman D. Wendt, West Chester, Pa., assignor to Milk Processes, Inc., Philadelphia, Pa., a corporation of Pennsylvania Application January 4, 1934, Serial No. 705,209

4 Claims. (Cl. 99—234)

The present invention relates to improvements in the treatment of cream and it is particularly concerned with the cooling and packaging of cream having an unusually high content of butter fat. Such a cream and a process for producing it are described in my prior Patent No. 1,791,068 of February 3, 1931. That patent describes a process of centrifugal separation by means of which a super-cream having a butter fat content of over 65% may be produced. It also described the advantages of manipulation and storage which can be attained by the manufacture of such a cream and its subsequent shipment or storage in a cooled condition until it is desired to use this cream or convert it into another creamery product, such as a cream of lower butter fat content, ice cream or butter.

The production of a super-cream having a butter fat content in excess of 65% in accordance with the method described in my prior patent requires that the milk or cream from which the super-cream is produced by centrifugal separation be preheated prior to the final centrifugal separating step to a temperature substantially in excess of the melting point of the butter fat which it contains or to a pasteurizing temperature. In connection with the production and storage of a product of this type it is, of course, important that the product be promptly cooled after the final step of centrifugal separation in order to avoid deterioration. As explained in my prior patent, this super-cream, like other creams, constitutes an emulsion of dispersed milk fat particles in a continuous liquid phase. The application of substantial pressure or the mechanical manipulation of such a super-cream results in the reversal of phase of at least a portion of this emulsion and a consequent conversion of at least a part of the cream into butter. In connection with many of the applications of the resulting product such phase reversal is highly undesirable, and an important object of the present invention resides in the conception of a method and apparatus by which the cream produced in accordance with my prior patent may be efficiently cooled and packaged commercially without effecting such undesired reversal of phase.

Considerable difficulty is encountered in connection with the handling and packaging of a cream of this character after it has been cooled sufficiently to render it plastic and another feature of the present invention consists in the conception of methods and apparatus for effectively conveying the cooled plastic cream and placing it in a storage or shipment container.

Further objects and advantages of the invention and the manner in which they have been attained will be obvious from a reading of the subjoined specification, in the light of the attached drawings, in which:

Fig. 1 is a side elevation of a centrifugal separator associated with apparatus forming the subject matter of the present invention.

Fig. 2 is an end view of the same.

Figure 4:
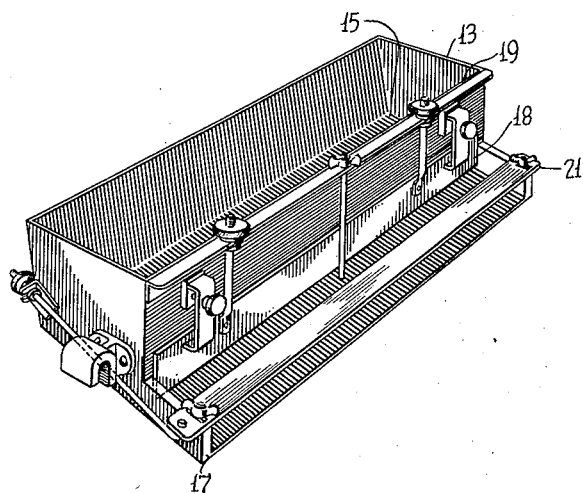
Fig. 4 is a detailed perspective view of a feed hopper forming a part of the invention.
Figure 5:
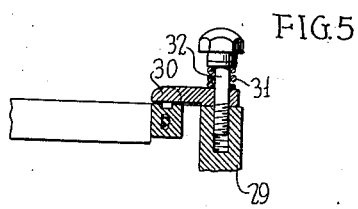
Fig. 5 is a cross sectional view taken on the line 5—5 of Fig. 3.

Referring to the drawings by reference characters, the numeral 10 indicates a centrifugal separator adapted to receive a cream or milk of normal butter fat content through a feed conduit 14 and to effect discharge of a cream effluent of high butter fat content at 12 and of a skimmed milk effluent at 11. Features of the present invention relate to the subsequent treatment of the cream effluent to transform this effluent into a plastic solid condition in which it may be packaged and/or treated to produce other creamery products as described in my prior patent, above identified. Cream discharged from the centrifuge is directed by means of a trough 12 into a hopper 13 from which it is fed to the cooling and conveying arrangements of the present invention. Cream which collects in this hopper is in turn fed through a second feed trough 17 to a cooling drum 16. The feed trough 12, the bottom 15 of the hopper 13 and the feed trough 17 are all arranged at a substantial angle to the horizontal in order to facilitate the flow of the relatively viscous cream discharged from the centrifuge to the cooling drum 16.

The discharge of cream from the hopper 13 to the feed trough 17 is controlled by a gate 18 which is adjustably secured to the forward wall 19 of the hopper 13. The forward end of the trough 17 extends into close proximity with respect to the circumference of the cooling drum 16, the spacing of these members being such as to afford provision for an accumulation of a small quantity of liquid cream between these members, as indicated at 20. The cooling drum 16 is adapted to be rotated in the direction indicated by the arrow in Fig. 3 and a part of the cream accumulating at 20 adheres to this drum during the upward movement of the drum surface through the pool of cream.

A regulating blade or mechanism 21 is adjustably secured to the trough 17 and hopper 13 for regulating the thickness of the film of cream which adheres to the drum 16 during its rotation, surplus cream removed by the regulating blade 21 being returned to the body of cream 20 lying within the trough 17. The regulated film of cream adhering to the cooling drum is rotated with the drum during the cooling operation and removed from the drum by means of a shaving blade or mechanism 22 which includes a knife-edged blade 23 lying in contact with the drum. The cooled cream which is shaved from the drum by the blade 23 at this stage of the operation of the apparatus has a strong tendency to adhere to the shaving blade by which it is removed from the drum. If a blade of ordinary construction were provided, this tendency would result in the accumulation and agitation of irregular lumps of cooled plastic cream along the blade surface and a scattered discharge from the blade. Such scattered discharge is inconsistent with adequate phase control of the discharged product and the invention accordingly includes a special type of discharge apparatus by which the cream is discharged in the form of a continuous sheet. To this end a knife edged delivery blade 24 is adjustably secured to the pivoted arm 25 which carries the shaving blade 23, this continuous delivery blade 24 extending at an acute angle with respect to the shaving surface of the blade 23 and having a deflecting surface spaced from that blade a small distance.

The pivoted arms 25 which carry the shaving blade 23 and delivery blade 24 are mounted upon a pivot pin 27 mounted for adjustment along slot 26 for obtaining the best shaving angle of blade 23 against drum 16. A screw 28 which is secured within a fixed support 29 affords the means for effecting such adjustment, the position of the pivot pin 27 within the slot 26 being adjusted by manipulation of this screw. The shaving mechanism is maintained in a position in which the shaving blade 23 contacts the drum 16, by means of a pivoted holding arm 30 which abuts one of the pivoted arms 25 or associated parts. The holding arm 30 is urged toward the drum 16 by the compressive force of a spring 31 which is secured in place by a pivot screw 32 secured to a portion of the support 29.

Figure 3:
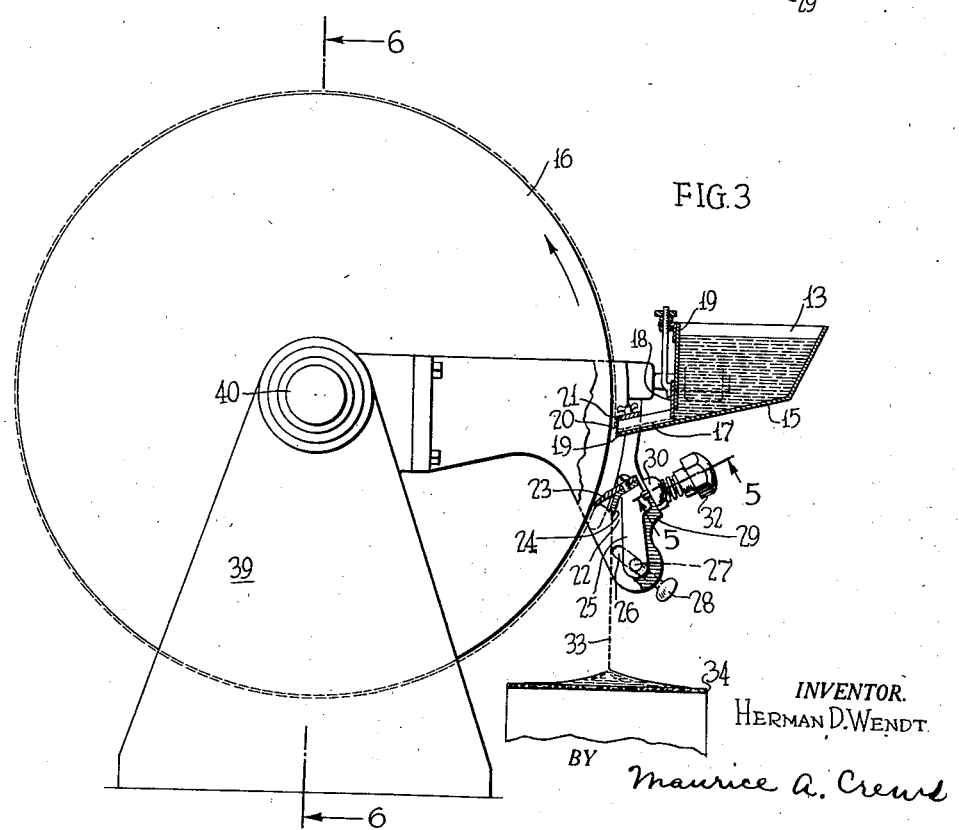
Fig. 3 is a side elevation of a cooling drum forming a part of the invention together with feeding and discharging apparatus associated therewith, parts of the feeding and discharging apparatus being illustrated in section.

It will be evident from an inspection of Fig. 3 that cream shaved from the drum 16 by blade 23 will be deflected toward the blade 24 and by this blade directed in a coherent sheet toward the zone of delivery, as indicated at 33. The deflecting surface of the blade 24 is of a very limited extent in the direction of flow of the discharged sheet and does not, therefore, cause substantial danger of adhesion and consequent agitation of the sheet and breaking up of this sheet into lumps. The provision of a separate delivery blade, instead of merely affording a shaving blade with a deflecting surface of substantial extent adapted to direct the material in the desired direction, constitutes an important feature of my invention. If the shaving blade were extended to afford a deflecting surface, the viscous cream would tend to adhere to this extended surface and thus cause agitation and breakage of the cream into lumps and irregular delivery of such lumps. By affording spaced directing surfaces of limited extent in the direction of flow of the sheet of cream, I have succeeded in avoiding these difficulties.

In the actual design and use of apparatus of the type described above, it is desirable that a cooling drum 16 having a substantially wide cooling surface be employed. The use of such a drum has the disadvantage, however, that it causes difficulty in the manipulation of cream discharged as indicated at 33. This cream is in the form of a plastic sheet and is a true cream, but the application of a substantial pressure or agitation to such cream results in the conversion of at least a part of the cream into butter. The sheet of cream presents difficulty in connection with attempts to control its flow or delivery into receptacles of less width than the sheet itself and these difficulties are increased by reason of the tendency toward butter formation upon the application of directing pressure. In the practice of the present invention these difficulties have been solved by directing the cream onto a belt 34 which moves at right angles to the plane of the sheet 33 discharged from the cooling drum. This belt 34 is substantially narrower than the sheet of cream which is fed thereto and the cream may accordingly be discharged from this belt into a receiving hopper or other receptacle having the desired width. In the illustrated embodiment the cream is received upon the belt 34 and delivered by this belt across a scraper blade 35 forming a part of a packaging hopper 36 which is provided with a gate 37 through which, by manipulation of the gate, cream may be intermittently directed into a receptacle 38 in which it is adapted to be stored or shipped.

Figure 6:
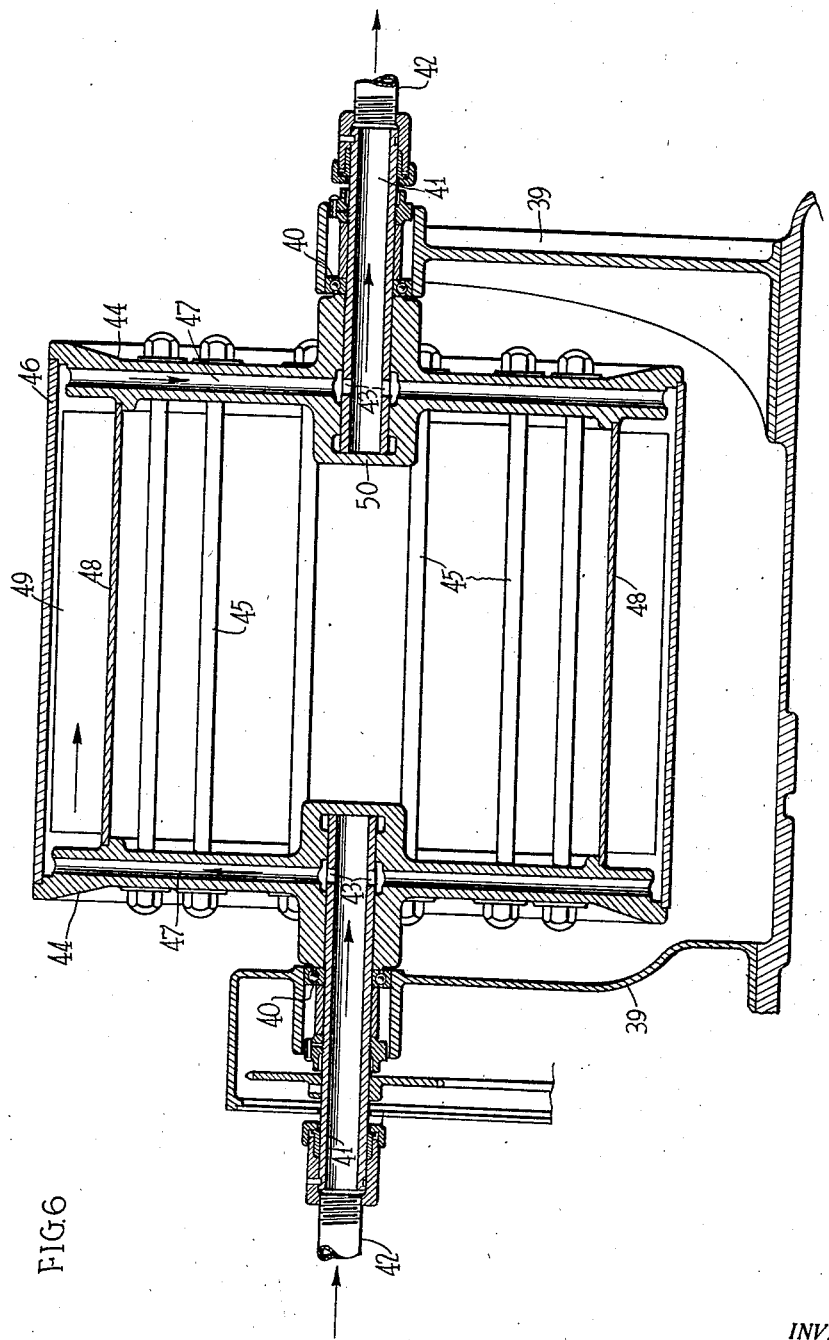
Fig. 6 is a central vertical section taken on the line 6—6 of Fig. 3.

The detailed construction of the cooling drum and associated parts is illustrated in Fig. 6. This cooling drum is mounted on a supporting frame 39 by means of bearings 40 within which hollow shafts 41 secured to the ends of the cooling drum are adapted to rotate. These shafts are secured to feed and discharge pipes 42 forming a part of the circulating system by which cooled liquid is fed through the drum. The hollow shafts 41 are provided with discharge openings 43 which communicate with radial passages 47 in the end walls 44 of the drum and the inner ends of the shafts are closed by abutment against bosses 50. These end walls are held together by through bolts 45 and liquid is confined within the drum by means of a circumferentially extending wall 46 whose outer surface forms the cooling surface of the drum. An annular partition 48 is spaced radially from the circumferential wall 46 and forms with this wall an annular space through which cooling liquid is adapted to flow axially from one side of the drum to the other. A plurality of radial partitions 49 prevent extensive flow of liquid circumferentially of the drum and direct the flow of liquid through the drum in an axial direction. The flow of liquid from the feed pipe 42 at the left hand side of Fig. 6 and associated drum parts into the discharge pipe 42 at the right hand side of that figure is illustrated by arrows.

The manner in which the objects of the invention have been attained will now be apparent. It will be seen that the practice of the invention involves a feed of liquid cream to the cooling drum under the influence of gravity and that no substantial pressure or intense mechanical manipulation is applied to it incident to its flow to the drum, adhesion to the drum surface, cooling, discharge from the drum surface or feed to the receiving hopper and/or other receptacle. It will also be evident that the particular design of shaving and delivery apparatus by which the plastic cream is removed from the cooling drum affords an accurate and continuous delivery of the cream in the form of a thin sheet to a desired location upon a receiving belt and that the delivery of this cream from the cooling drum to a narrower belt which moves at right angles to the direction of rotation of the drum effects continuous conveyance of a body of cream which is sufficiently narrow to be discharged into a receptacle with a minimum of mechanical manipulation, thereby avoiding the conversion of any part of the cream into butter. It will also be seen that the particular type of cooling drum adopted affords a rapid, continuous and efficient cooling of the film of cream which is flowed upon the outer surface of the drum.

Modifications will be obvious to those skilled in the art and I do not therefore wish to be limited except by the scope of my sub-joined claims.

I claim:

1. In apparatus for producing a plastic cream of high butter fat content, the combination comprising means for feeding liquid cream of the desired butter fat content into adhesive contact with a cooling surface, means for effecting movement of said cooling surface during the cooling of adherent cream thereon, and means for effecting discharge of cooled cream from the cooling surface, said last named means including a downwardly directed blade adapted to shave cream from the cooling surface and a downwardly directed deflector mounted at an acute angle with respect to said blade and adapted to direct the cream shaved from the cooling surface in the form of a sheet downwardly from the cooling surface.

2. In apparatus for producing a plastic cream of high butter fat content, the combination comprising means for feeding liquid cream of the desired butter fat content into adhesive contact with a cooling surface, means for effecting movement of said cooling surface during the cooling of adherent cream thereon, and means for effecting discharge of cooled cream from the cooling surface, said last named means including a downwardly directed blade adapted to shave cream from the cooling surface and a downwardly directed deflector of limited extent longitudinally of the direction of movement of the cream mounted at an acute angle with respect to said blade and adapted to direct the cream shaved from the cooling surface in the form of a sheet downwardly from the cooling surface.

3. In apparatus for producing a plastic cream of high butter fat content, the combination comprising means for feeding liquid cream of the desired butter fat content into adhesive contact with a cooling surface, means for effecting movement of said cooling surface during the cooling of adherent cream thereon, and means for effecting discharge of cooled cream from the cooling surface, said last named means including a downwardly directed blade adapted to shave cream from the cooling surface and a downwardly directed deflector adjustably mounted at an acute angle with respect to the shaving blade and adapted to direct the cream shaved from the cooling surface in the form of a sheet from the cooling surface.

4. In apparatus for producing a plastic cream of high butter fat content, the combination comprising means for feeding liquid cream of the desired butter fat content into adhesive contact with a cooling surface, means for effecting movement of said cooling surface during the cooling of adherent cream thereon, and means for effecting discharge of cooled cream from the cooling surface, said last named means being pivotally and transversely movable with respect to the cooling surface and including a downwardly directed shaving blade adapted to shave cream from the cooling surface and a downwardly directed deflector mounted at an acute angle with respect to said shaving blade and adapted to direct the cream shaved from the cooling surface in the form of a sheet from the cooling surface.

HERMAN D. WENDT.